(12) United States Patent
Musuluri

(10) Patent No.: US 10,942,961 B2
(45) Date of Patent: Mar. 9, 2021

(54) SYSTEM AND METHOD FOR ENHANCING USER EXPERIENCE IN A SEARCH ENVIRONMENT

(71) Applicant: Aravind Musuluri, Birmingham, AL (US)

(72) Inventor: Aravind Musuluri, Birmingham, AL (US)

(*) Notice: Subject to any disclaimer, the term of this patent is extended or adjusted under 35 U.S.C. 154(b) by 468 days.

(21) Appl. No.: 15/231,776

(22) Filed: Aug. 8, 2016

(65) Prior Publication Data
US 2016/0350413 A1 Dec. 1, 2016

Related U.S. Application Data

(63) Continuation-in-part of application No. 14/679,518, filed on Apr. 6, 2015, now abandoned.

(51) Int. Cl.
*G06F 16/34* (2019.01)
*G06F 16/338* (2019.01)
*G06F 16/951* (2019.01)
*G06F 16/33* (2019.01)

(52) U.S. Cl.
CPC .......... *G06F 16/345* (2019.01); *G06F 16/338* (2019.01); *G06F 16/3331* (2019.01); *G06F 16/951* (2019.01)

(58) Field of Classification Search
CPC ......... G06F 17/30719; G06F 17/30696; G06F 17/30864; G06F 17/212; G06F 17/2264; G06F 17/30887; G06F 17/3089; G06F 3/04842; G06F 3/1247; G06F 3/1287; G06F 17/211; G06F 17/2205; G06F 17/2229; G06F 17/2235; G06F 17/30038; G06F 17/30056; G06F 17/30876; G06F 17/30899; G06F 17/3092; G06F 2203/04803; G06F 3/0484; G06F 3/1206; G06F 3/1213; G06F 3/122; G06F 3/1248; G06F 3/1271; G06F 3/1288; G06F 3/14; G06F 9/46
USPC ........................................................ 707/706
See application file for complete search history.

(56) References Cited

U.S. PATENT DOCUMENTS

| | | | | |
|---|---|---|---|---|
| 7,379,811 B2* | 5/2008 | Rasmussen | ............ | G09B 29/10 |
| | | | | 701/532 |
| 7,676,455 B2* | 3/2010 | Ursitti | ..................... | G06F 16/34 |
| | | | | 707/804 |
| 7,894,984 B2* | 2/2011 | Rasmussen | ............ | G06T 17/05 |
| | | | | 701/452 |
| 8,014,946 B2* | 9/2011 | Rasmussen | ............ | G01C 21/32 |
| | | | | 701/439 |
| 8,495,058 B2* | 7/2013 | Kulick | ................... | G06Q 10/10 |
| | | | | 707/722 |
| 8,578,261 B1* | 11/2013 | Gupta | ............... | G06F 17/30899 |
| | | | | 715/205 |
| 9,292,618 B2* | 3/2016 | Melnyk | ............... | H04L 67/2823 |
| 2005/0270311 A1* | 12/2005 | Rasmussen | ............ | G01C 21/32 |
| | | | | 345/677 |
| 2008/0027933 A1* | 1/2008 | Hussam | ................ | G06F 16/338 |
| 2008/0291205 A1* | 11/2008 | Rasmussen | ............... | G06T 3/40 |
| | | | | 345/441 |

(Continued)

*Primary Examiner* — Sheree N Brown

(57) ABSTRACT

Systems and methods for enhancing user experience in a search environment are provided. The method includes displaying results of a search operation, the display comprising an extract of at least one search result; the extract comprising a combination of a text and at least one inline visual representation.

12 Claims, 7 Drawing Sheets

(56) References Cited

U.S. PATENT DOCUMENTS

| | | | |
|---|---|---|---|
| 2010/0201707 A1* | 8/2010 | Rasmussen | G01C 21/32 345/620 |
| 2011/0137766 A1* | 6/2011 | Rasmussen | G01C 21/32 705/30 |
| 2012/0075337 A1* | 3/2012 | Rasmussen | G09B 29/004 345/629 |
| 2013/0346396 A1* | 12/2013 | Stamm | G06F 16/248 707/722 |
| 2014/0195527 A1* | 7/2014 | Kim | G06F 17/30528 707/723 |
| 2014/0222553 A1* | 8/2014 | Bowman | G06Q 30/0276 705/14.45 |
| 2016/0077684 A1* | 3/2016 | Liu | G06F 3/0481 715/765 |

* cited by examiner

Source Content
400

```
<TABLE>
  <caption>2012 Summer Olympics medal table</caption>
  ...
  <TR>
    <TD>4</TD>
    <TD><IMG src="russia.jpg"/>Russia (RUS)</TD>
    <TD>24</TD>
    <TD>25</TD>
    <TD>32</TD>
    <TD>81</TD>
  </TR>
  <TR>
    <TD>5</TD>
    <TD><IMG src="south_korea.jpg"/>South Korea (KOR)</TD>
    <TD>13</TD>
    <TD>8</TD>
    <TD>7</TD>
    <TD>28</TD>
  </TR>
  ...
<TABLE>
```

401 — `<TABLE>`
403a — `<TR>` (first)
402a — Russia row IMG
403b — `<TR>` (second)
402b — South Korea row IMG

FIG. 4A

Presentation Semantics
410

```
table tr td
{
  line-height: 14px;
  font-size: 12px;
  font-family: Arial;
  font-weight: bold;
}
```

411 — line-height: 14px;
412 — font-size, font-family, font-weight

FIG. 4B

SYSTEM AND METHOD FOR ENHANCING USER EXPERIENCE IN A SEARCH ENVIRONMENT

CROSS REFERENCE TO RELATED APPLICATIONS

This application is a continuation-in-part of U.S. application Ser. No. 14/679,518 entitled "System And Method For Enhancing User Experience In A Search Environment" filed on Apr. 6, 2015 which claims priority to U.S. Provisional Application Ser. No. 61/975,861 entitled "System and Method For Enhancing User Experience In A Search Environment" filed on Apr. 6, 2014, which are incorporated herein by reference.

TECHNICAL FIELD

The present disclosure generally relates to search engine operations and method to display the results of a search operation. Particularly, the disclosure relates to improving user experience in viewing the search results and more particularly to a system and method for displaying search results accompanied with inline visual representations.

BACKGROUND

The statements in this section merely provide background information related to the present disclosure and may not constitute prior art.

It is commonly required in the field of Information Technology to provide a service that searches through data sources. The data source herein may refer to data and/or document(s) on the Internet, intranet, storage devices, and so on. In order to use a search engine, a user seeking information on a desired topic generally inputs a search query consisting of keyword(s) or phrase(s) relevant to the topic into the search interface of the search engine. In response, the search engine typically displays a report with a prioritized list of links pointing to relevant documents containing the search keywords. Oftentimes, a short summary of text i.e., extract/snippet is also included for each result. The extract/snippet is that portion or portions of the text in the document that contain the keywords from the search query.

While the popularity of search engines may rely on various factors; relevancy of the search results and the manner in which they are displayed play an important role in enhancing a user experience. Known search engines like Google®, Bing®, Yahoo® etc. typically display a search result page comprising multiple search results and for each search result an extract in a textual format. This is a disadvantage since some important visual cues in the document may be lost, thereby making the results less useful to a user; One example of such disadvantage is when image(s) are present in that portion of the document that contain the query keywords. The search engines only display text around the relevant portion that makes it less useful to the user.

Systems for searching the Intranets, Extranets, Local Area Networks, individual computers and even single documents also generally suffer from these same drawbacks.

In view of the above drawbacks, there remains a need for an effective method of searching data sources for useful information relating to topics of interest.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Exemplary embodiments of the present disclosure are directed towards a method and system for displaying the search results of a search operation comprising one or more inline visual representations.

According to the aspects illustrated herein, the present disclosure relates to a method to display the results of a search operation on at least one data source, the display comprising an extract of at least one search result; the extract comprising a combination of at least one relevant portion of the text and at least one inline visual representation, wherein the relevant portion and the inline visual representation are in continuation with each other.

In a preferred embodiment, the relevant portion and the inline visual representation are arranged in continuation with each other, in accordance with their arrangement in the document.

In another embodiment, the relevant portion and the inline visual representation are altered to incorporate the inline visual representation before or after the relevant portion of the text.

In another embodiment, the display of the inline visual representation may or may not be altered.

In another aspect of the present disclosure, the invention relates to a method executable on a computing device comprising a processor, memory and a storage unit to display results of a search operation on at least one data source(s) comprising document(s), said method comprising: (i) Accepting a search query and identifying search results comprising of relevant documents containing the search query in the data source; (ii) Constructing a search extract for each search result comprising a relevant portion(s) of the corresponding document; (iii) Identifying visual representation(s) in the search extract; (iv) Determining the properties of the visual representation(s); (v) Identifying inline visual representation(s) from the identified visual representation(s), wherein the inline visual representation comprises a visual representation of a height that is same or smaller as the height of a line of text in which the visual representation occurs; (vi) Optionally alter the height of a visual representation to form an inline visual representation; (vii) Return the search results comprising of search extract to the user comprising the inline visual representation.

The visual representation in accordance with the invention are selected from an image, a multimedia object, a video, an audio and combinations thereof.

The height of the line in accordance with the methods of the invention may be calculated by the font size, row height, presentation semantics and combinations thereof.

In one embodiment, the height of the line of text is a fixed value.

In a preferred embodiment, the fixed value is 30 px.

In another aspect of the present disclosure is provided with a system comprising search engine unit. The search engine unit may comprise one or more logics configured to perform the functions and operations associated with the above-disclosed methods.

In another aspect of the present disclosure is provided a computer program product executable in a memory of a search engine unit

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

Other objects and advantages of the present disclosure will become apparent to those skilled in the art upon reading the following detailed description of the preferred embodiments, in conjunction with the accompanying drawings, wherein:

FIG. 4A depicts portion of exemplary source content data for the document of FIG. 3.

FIG. 4B depicts portion of exemplary presentation semantics for the document of FIG. 3.

DETAILED DESCRIPTION

Figure 1:
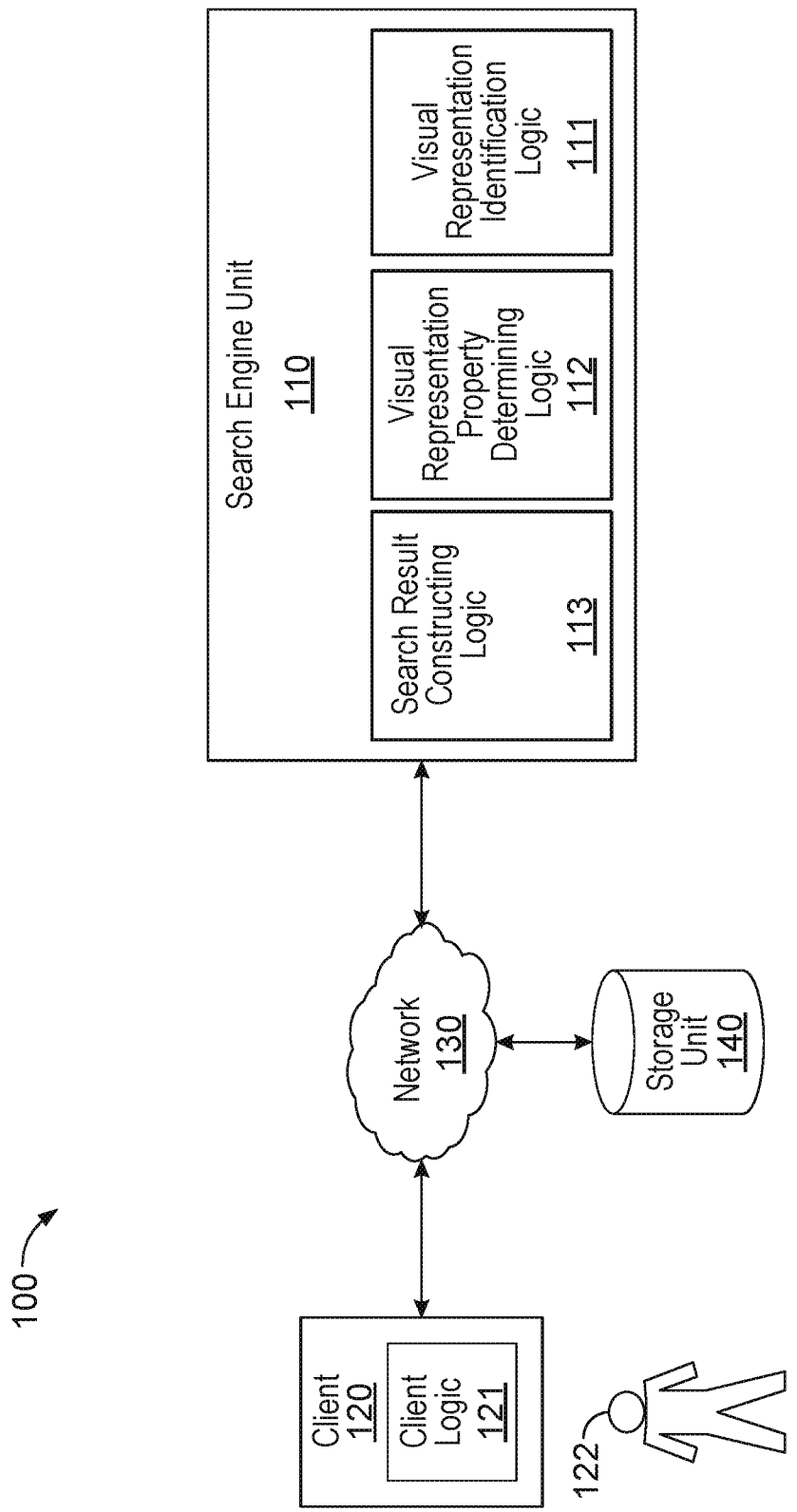
FIG. 1 is a block diagram illustrating an exemplary search environment in accordance with an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to searching and returning links to any document containing text and optional presentation semantics (the look and feel instructions) such as, but not limited to, HTML, DHTML, XML, SGML, PDF, E-mail, Microsoft® Word documents, Microsoft® Power point documents, news group postings, multimedia objects and/or Shockwave Flash files.

Through the length of the specification and claims, the words "extract" and "snippet" are used interchangeably.

The visual representation in accordance with the present disclosure may include an image, audio, video, or multimedia object or identifiers of such image, audio, video or multimedia object.

Inline visual representation in accordance with the present disclosure refers to any visual representation appearing in the beginning, at the end or in between the relevant text of the extract and appears to be of the same height as the line of the text in which the visual representation occurs.

FIG. 1 depicts a search environment 100 in accordance with an exemplary embodiment of the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present invention. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The search engine unit 110 may be a dedicated or shared server including but not limited to any type of application server, database server, or file server configurable and combinations thereof. The search engine unit 110 and the client 120 may include, but are not limited to, a computer, handheld unit, mobile unit, consumer electronic unit, or the like.

The exemplary search engine unit 110 comprises visual representation identification logic 111, visual representation property determining logic 112 and search result constructing logic 113.

In the exemplary search engine unit 110, the visual representation identification logic 111 may be configured to identify presence or existence of the visual representation(s) within the snippet of the search result.

The search engine unit 110 further comprises the visual representation property determining logic 112. The visual representation property determining logic 112 may be configured to determine the properties of one or more visual representations which are identified by the visual representation identification logic 111. The properties identified by the visual representation property determining logic 112 may be, for example, type, size, original dimensions, display dimensions, display location, creation date, author, color, file format and the like.

The search engine unit 110 further comprises the search result constructing logic 113. The search result constructing logic 113 may be configured to construct the search result. The process of constructing the search result may include identifying inline visual representation(s) within a search extract from among the visual representations identified by the visual representation identifying logic (111) by comparing the height of visual representation (identified by the visual representation property determining logic (112)) with the height of the line of the text in the extract and determining if the visual representation is inline visual representation.

In one embodiment, visual representations may be modified. For example, the modifications that may be performed on the visual representation may be converting the color visual representation to black and white visual representation and/or converting black and white visual representation to color visual representation, resizing the visual representation to one or more dimensions of a line, resizing the visual representation to a fixed height, converting the file format and the like. The search result constructing logic 113 may also be configured to display identifiers/labels in place of or in addition to inline visual representation(s).

The storage unit 140 is configured to store information associated with search results, visual representations, or the like. In various embodiments, such information may include, without limitation, domains, URLs, webpages, websites, visual representations, properties of visual representations, indexes, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable and may include any information relevant to search results, visual representations, or the like. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. Moreover, the storage unit 140 may be included within the search engine unit 110 or client 120 as a computer-storage medium. The single unit depictions are meant for clarity, not to limit the scope of embodiments in any form.

A user 122 through the client logic 121 on the client 120 may enter a search query consisting of keyword(s) which may identify the type of information that the user is interested in retrieving. The client logic 121 may comprise, for example, an Internet browser; however, other types of client logic 121 for interfacing with the user 122 and for communicating with the search engine unit 110 may be used in other embodiments of the present disclosure. The client logic 121 transmits the user search query to the search engine unit 110 via the network 130. Upon receiving the user search query the search engine unit 110 examines the storage unit 140 and compiles a prioritized list of documents containing all or some of the keyword(s) and returns the search results comprising inline visual representation(s) to the client logic 121 which displays the results to the user 122 in a window.

Figure 2:
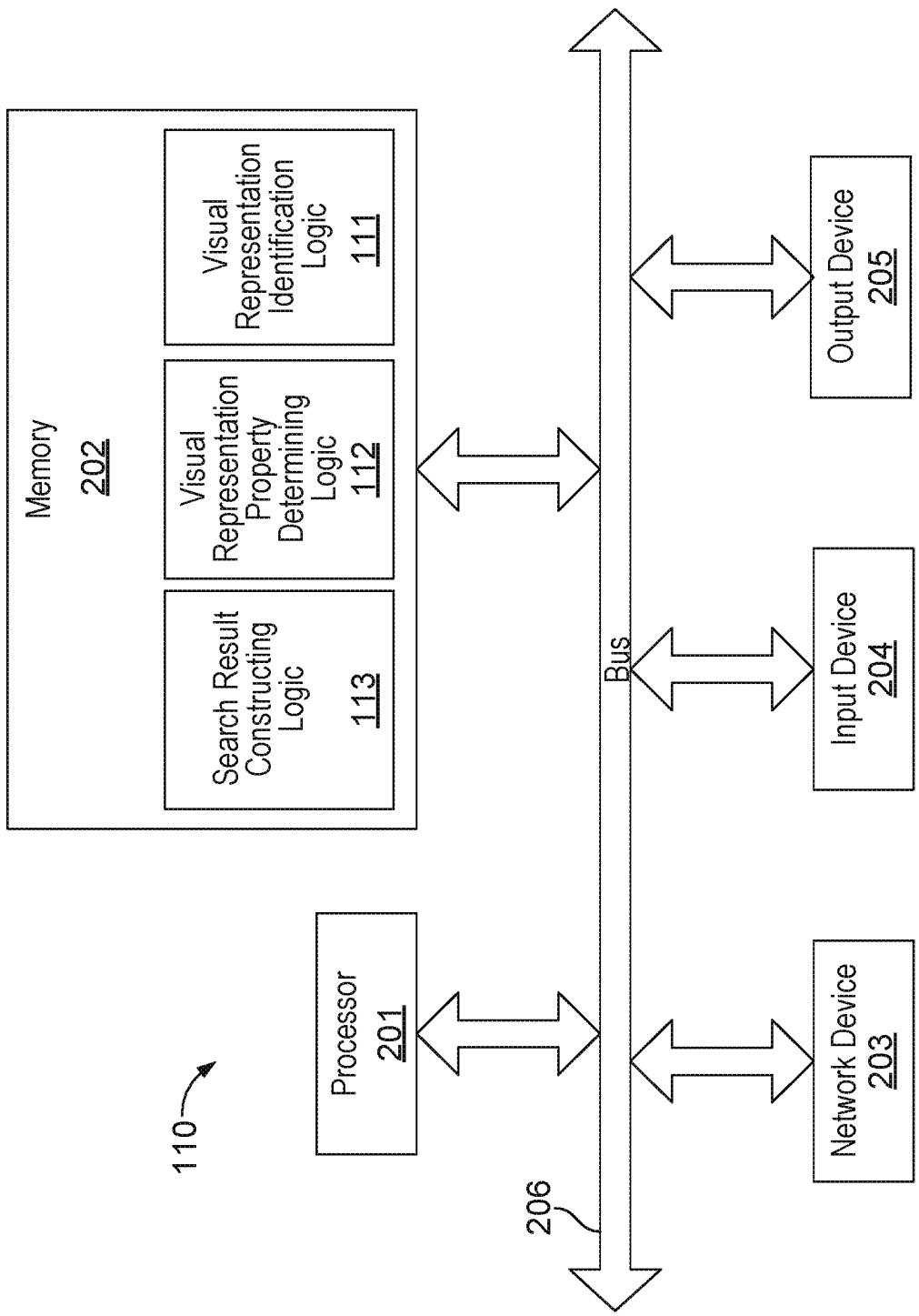
FIG. 2 is a block diagram of an exemplary computing device of FIG. 1.

In some preferred embodiments, the search engine unit 110 is shown in FIG. 2. It should be noted, however, that embodiments are not limited to implementation on such computing devices, but may be implemented on any of a variety of different types of computing units within the scope of embodiments hereof. The search engine unit 110 (as shown in FIG. 1) is only one example of a suitable computing/search environment and it is not intended to suggest any limitation as to the scope of use or functionality of the disclosure.

In some embodiments, the search engine unit 110 may include a bus 206, a processor 201, memory 202, network device 203, input device 204, and an output device 205. Bus 206 may include a path that permits communication among the components of the search engine unit 110.

The memory 202 stores the visual representation identification logic 111, the visual representation property determining logic 112, and the search result constructing logic 113 as software in memory 202.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The processor 201 comprises processing hardware for interpreting or executing tasks or instructions stored in memory 202. Note that the processor 201 may be a microprocessor, a digital processor, or other type of circuitry configured to run and/or execute instructions.

The network device 203 may be any type of network unit (e.g., a modem) known in the art or future-developed for communicating over a network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input unit 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of search engine unit 110 (FIG. 1) are performed by multiple computing units communicatively coupled to the network.

Further note that, the search engine unit 110 (FIG. 1) components may be implemented by software, hardware, firmware or any combination thereof. In the exemplary search engine unit 110, depicted by FIG. 1, all the components are implemented by software and stored in memory 202.

Figure 3:
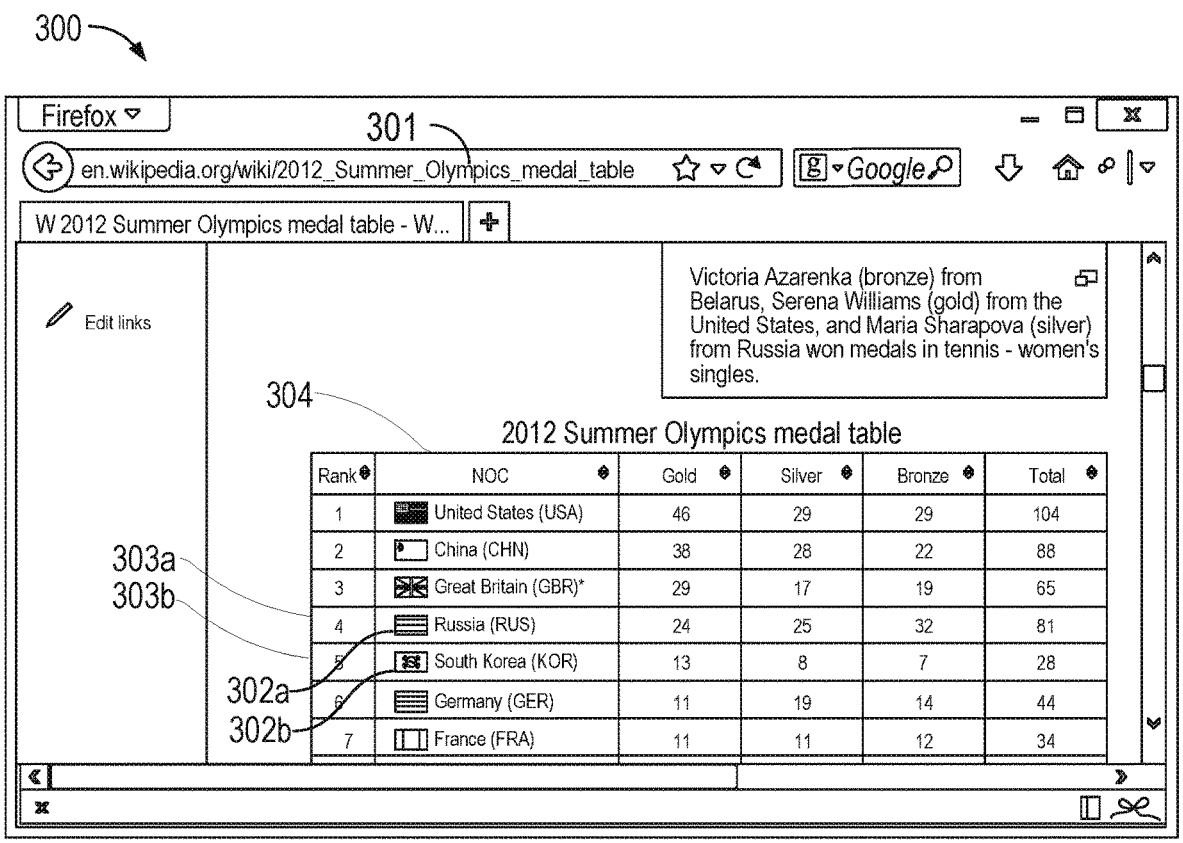
FIG. 3 illustrates an exemplary document comprising inline visual representations.

FIG. 3 is a diagram illustrating a portion of a document 300 identified by the URL 301. The document 300 comprises an exemplary table 304. Exemplary inline visual representations (images in this example) 302a and 302b that occur in between textual formats are illustrated in FIG. 3. Note that the height of the images 302a and 302b is the same as the line height of the text surrounding the images.

FIG. 4A depicts portion of exemplary source content data 400 for the document 300 of FIG. 3. The text enclosed by the table tag 401 depicts a portion of the table 304 (FIG. 3) source content. The source content for table rows 303a and 303b is enclosed within the tr tags 403a and 403b respectively. The source content for the images 302a and 302b is enclosed within the img tags 402a and 402b respectively.

Note that while the images are represented using the img tag in the exemplary embodiment, a variety of ways may be used to add visual representations to the source content including but not limited to, background-image css property, audio tag, audio controls tag, video tag etc., The visual representation identification logic 111 (FIG. 1) may be configured to identify the above variety of ways.

FIG. 4B depicts portion of exemplary presentation semantics for the document of FIG. 3. In the exemplary presentation semantics, the height of the text within the table 304 (FIG. 3) is specified as "14 px" 411. The search result constructing logic 113 (FIG. 3) may parse the presentation semantics 410 to determine the height of text.

Note that in one embodiment, the presentation semantics may be implicit, i.e., the presentation semantics are not explicitly specified but default values are assumed in which case the search result constructing logic 113 (FIG. 1) uses the default values in computing the height of text.

Figure 5:
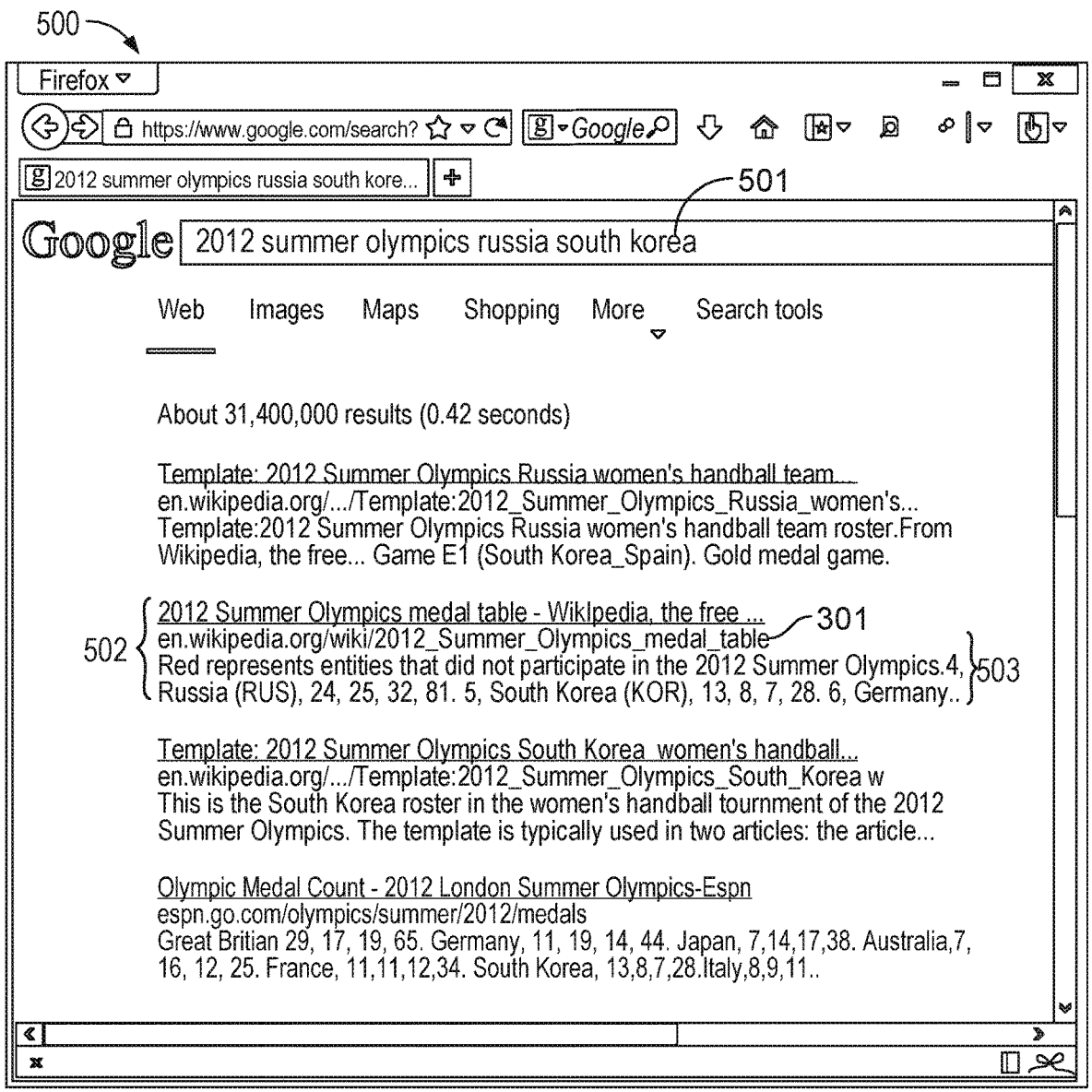
FIG. 5 (Prior Art) and FIG. 6 depict an exemplary search operation with a comparative illustration of known prior art methods and methods in accordance with the present disclosure.

FIG. 5 shows a known prior art method of displaying results of a search operation. When a user enters a search query 501, the search engine performs a search operation and returns the search results to the user in the form of a result page 500. The search result 502 comprises a snippet 503 from the document 300 (FIG. 3) identified by the URL 301 (FIG. 3). The snippet 503 comprising of text and no inline visual images 302a (FIG. 3) and 302b (FIG. 3).

Figure 6:

FIG. 6 depicts portion of search results page 600 in accordance with embodiment of the present disclosure. When the user enters a search query 501 (FIG. 5), the search engine unit 110 (FIG. 1) may return search results to the user in the form of the search result page 600. The search result 602 comprises a snippet 603 from the document 300 (FIG. 3) identified by the URL 301. The snippet 603 comprises relevant portions of the document 300 comprising relevant text and inline visual images 302a and 302b (FIG. 3) to enhance the user experience. In the exemplary embodiment, the visual representation identification logic 111 (FIG. 1) may identify the images 302a (FIG. 3) and 302b (FIG. 3) by the img tags 402a (FIG. 4) and 402b (FIG. 4) within in the source content of the document 300 (FIG. 3) comprising the snippet 603. In the exemplary embodiment, the images 302a and 302b (FIG. 3) display heights are calculated from the images by the visual representation property determining logic 112 and compared with line height of text in the table rows 303a (FIG. 3) and 303b (FIG. 3) comprising the extract 603. The line height for the text is determined by the search result constructing logic 113 (FIG. 1) from the presentation semantics of the text (See FIG. 4). As the height of the images is not greater than the line height which makes them inline, the images are not altered.

Note that in one embodiment, the visual representation display dimensions may be specified as part of the presentation semantics, in which case the visual representation property determining logic 112 infers height of the visual representations from the presentation semantics.

Note that in one embodiment, the search result constructing logic 113 (FIG. 1) may infer the line height of the surrounding text from, for example, but not limited to, font size, row height etc. For example, if the line height is not specified in the presentation semantics file, the line height may be inferred from the font size property.

Note that in one embodiment, the search result constructing logic 113 (FIG. 1) may assume a fixed value for relevant text line height and all visual representations with height less than the fixed value may be considered inline visual representations. For example, in one embodiment, the line height may be assumed as 30 px and images with height less than or equal to 30 px are assumed to be inline images.

Figure 7:
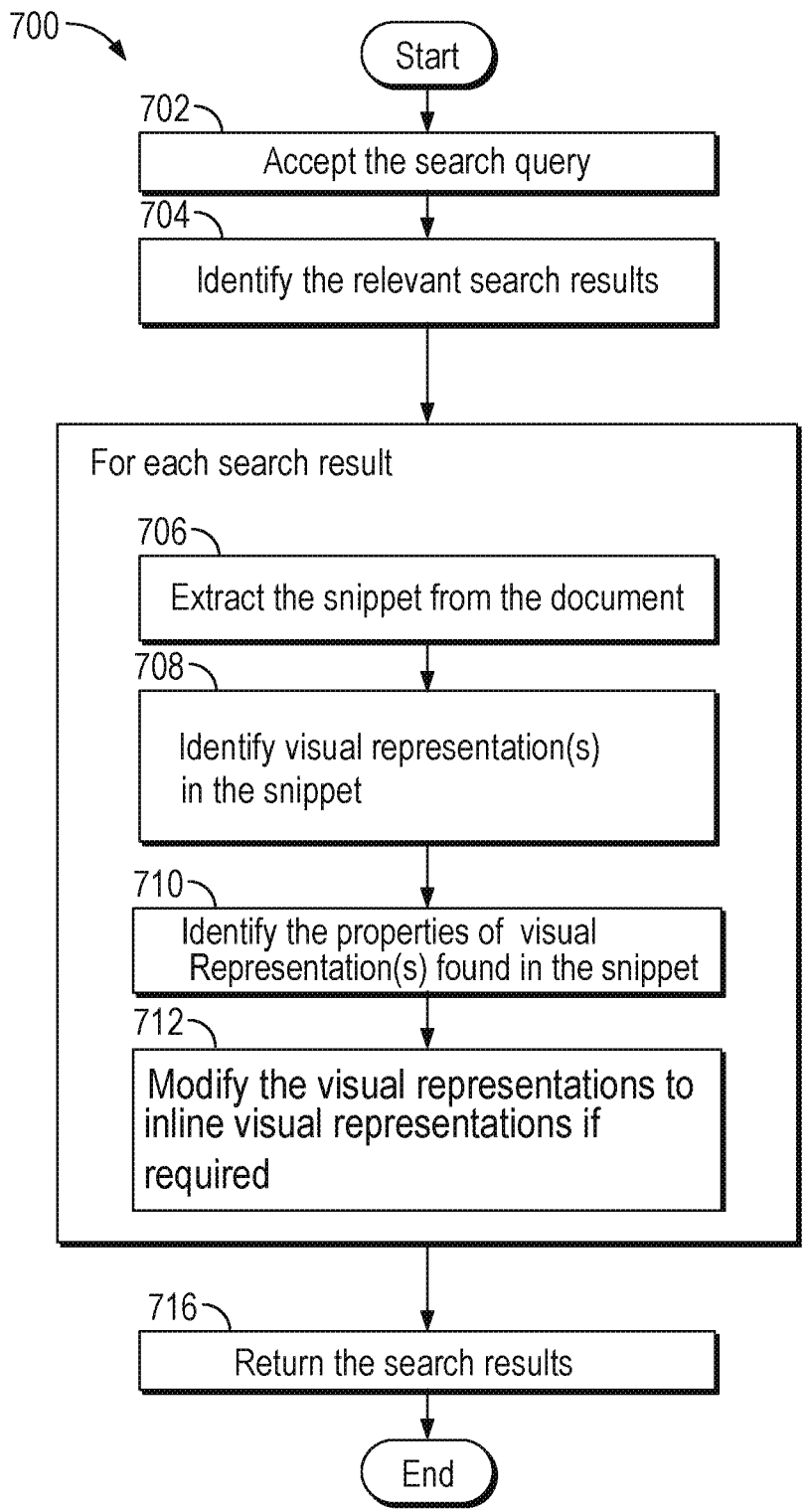
FIG. 7 is a flow diagram of a method of displaying search results comprising inline visual representations, in accordance with one or more embodiments.

FIG. 7 is a flow chart illustrating one method in accordance with the present disclosure. In step 702, the search engine unit 110 (FIG. 1) may accept the search query comprising the keyword(s)/search term(s). In step 704, the search engine unit 110 (FIG. 1) may find the relevant search results. For each relevant search result, step 706-712 may be performed by the search engine unit 110 (FIG. 1). In step 706 the snippet is extracted from the corresponding document. In step 708, the visual representation identification logic 111 (FIG. 1) may identify visual representation(s) in the document comprising the snippet. In step 710, the visual representation property determining logic 112 (FIG. 1) may identify the properties of the visual representation(s). In step 712, the search result constructing logic 113 (FIG. 1) may identify the height of the line of text and compare the height of visual representation(s) with the line height and modify the visual representation(s) if required to an inline visual representation. In step 716, the search results comprising text and inline visual representation(s) may be returned.

In some embodiments, the search results may be displayed without the inline visual representations appended to the snippet. On identifying a user action, for example clicking a link "show inline visual representations", the inline visual representations of the corresponding document may be displayed as part of the search results.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method executable on a computing device comprising a processor, memory and a storage unit to display results of a search operation on at least one data source comprising document(s), said method comprising:
   i. Accepting a search query from a user comprising of keyword(s) and identifying by the processor document (s) in the data source comprising the keyword(s) in response to the search query;
   ii. Constructing a search result in the memory by the processor for at least one identified document comprising of a relevant portion(s) of text in the document;
   iii. Identifying by the processor visual representation(s) appearing in the beginning, at the end or in between the relevant portion(s) of text in the document;
   iv. Identifying by the processor inline visual representation(s) from the identified visual representation(s) by comparing height of the visual representation to height of text in the document in which the visual representation occurs and determining that the visual representation is inline if the height of the visual representation is same or smaller than the height of the text in the document;
   vi. Return the search results comprising of the relevant portion(s) of text and the inline visual representation(s) to the user.

2. The method of claim 1, wherein arrangement of relevant portion(s) of the text and the inline visual representation(s) in the search result is in accordance with arrangement of the relevant portion(s) of the text and the inline visual representation(s) in the document.

3. The method of claim 1, wherein the height of text is a fixed value.

4. The method of claim 3, wherein the fixed value for the height text is 30 px.

5. The method of claim 1, wherein the inline visual representation is displayed differently from the inline visual representation in the document.

6. The method of claim 1, wherein the inline visual representation is displayed similar to the inline visual representation present in the document.

7. The method of claim 1, wherein the visual representation is an image.

8. The method of claim 1, wherein the visual representation is a multimedia object.

9. The method of claim 1, wherein the visual representation is a video.

10. The method of claim 1, wherein the visual representation is an audio.

11. The method of claim 1, wherein the inline visual representations(s) are placed before or after the relevant portion(s) of text in the search result.

12. The method of claim 1, further comprising altering the height of the visual representation to form an inline visual representation.

\* \* \* \* \*